(12) United States Patent
Yoshikawa et al.

(10) Patent No.: US 7,006,123 B2
(45) Date of Patent: *Feb. 28, 2006

(54) WIDE RANGE IMAGE PICKUP APPARATUS AND ARRANGEMENT FOR SUPPRESSING THE APPEARANCE OF PARALLAX

(75) Inventors: Koichi Yoshikawa, Kanagawa (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 666 days.

This patent is subject to a terminal disclaimer.

(21) Appl. No.: 10/072,223

(22) Filed: Feb. 6, 2002

(65) Prior Publication Data

US 2004/0201769 A1 Oct. 14, 2004

(30) Foreign Application Priority Data

| Feb. 7, 2001 | (JP) | ................................... P2001-030700 |
| Feb. 13, 2001 | (JP) | ................................... P2001-034846 |
| Sep. 28, 2001 | (JP) | ................................... P2001-301835 |

(51) Int. Cl.
*H04N 7/00* (2006.01)

(52) U.S. Cl. ............................. 348/36; 348/36; 348/335
(58) Field of Classification Search ................ 348/335, 348/222.1, 36, 47, 16; 359/631, 637, 433, 359/16

See application file for complete search history.

(56) References Cited

U.S. PATENT DOCUMENTS

| 5,743,847 A | * | 4/1998 | Nakamura et al. .......... 600/166 |
| 5,937,212 A | | 8/1999 | Kurahashi et al. |
| 6,141,034 A | * | 10/2000 | McCutchen .................. 348/36 |
| 6,549,650 B1 | * | 4/2003 | Ishikawa et al. ............ 382/154 |
| 2004/0042782 A1 | * | 3/2004 | Yoshikawa et al. ......... 396/322 |
| 2004/0051805 A1 | * | 3/2004 | Yoshikawa et al. ......... 348/335 |

FOREIGN PATENT DOCUMENTS

| EP | 07067020 | | 8/1993 |
| JP | 09331475 A | * | 12/1997 |
| JP | 11046317 A | * | 2/1999 |
| JP | 2001204015 A | * | 7/2001 |
| JP | 2002229137 A | * | 8/2002 |
| JP | 2002229139 A | * | 8/2002 |

* cited by examiner

*Primary Examiner*—Wendy R. Garber
*Assistant Examiner*—Nelson D. Hernandez
(74) *Attorney, Agent, or Firm*—Bell, Boyd & Lloyd LLC

(57) ABSTRACT

An image pickup apparatus which can suppress appearance of a parallax between images picked up by multiple cameras is disclosed. The image pickup apparatus includes several video cameras for individually picking tip images of a number of divisional image pickup objects of an image pickup object extending over a wide range. A processing section is provided for receiving image information from the video cameras and processing the image information to produce a single image by stitching images presented by the image information. A lens set including a number of lenses is provided in a lens barrel of each of the video cameras and has an aperture stop interposed therein. In one of the video camera, a straight line component in an object space of a principal ray which passes the center of the aperture stop and is positioned in a Gauss region is extended, and a point at which the extension intersects with the optical axis of the lens set is set as a first non-parallax point. The lens sets of the other video cameras are disposed such that such non-parallax points thereof are positioned within a spherical region of a radius of approximately 20 mm centered at the first non-parallax point.

7 Claims, 14 Drawing Sheets

F I G. 2
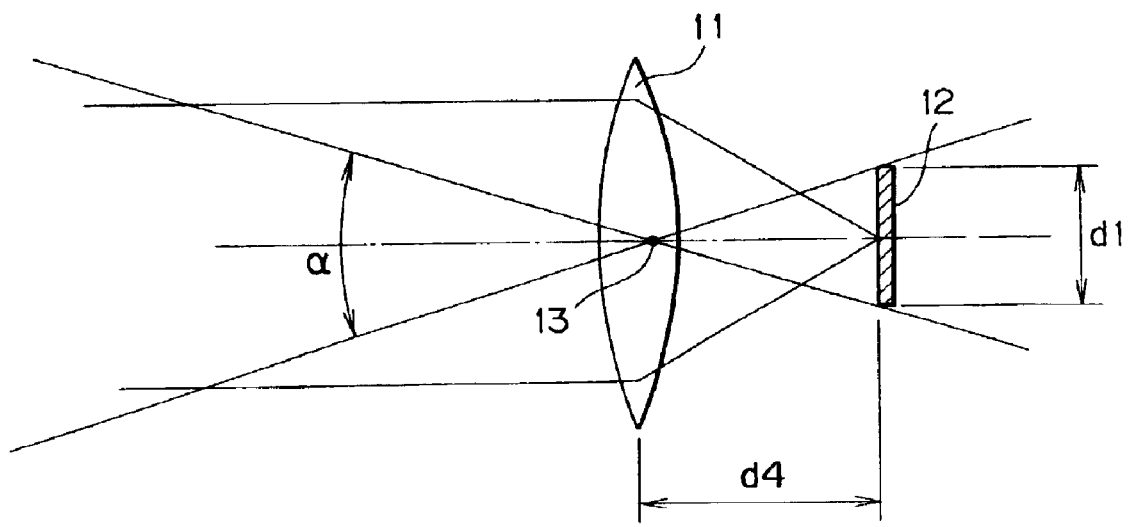

F I G. 10
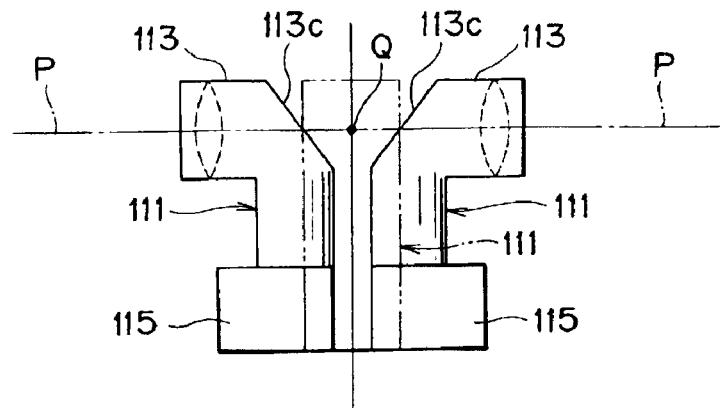
F I G. 11
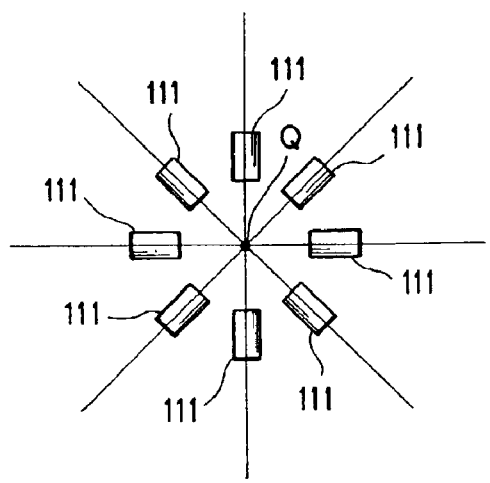
F I G. 12
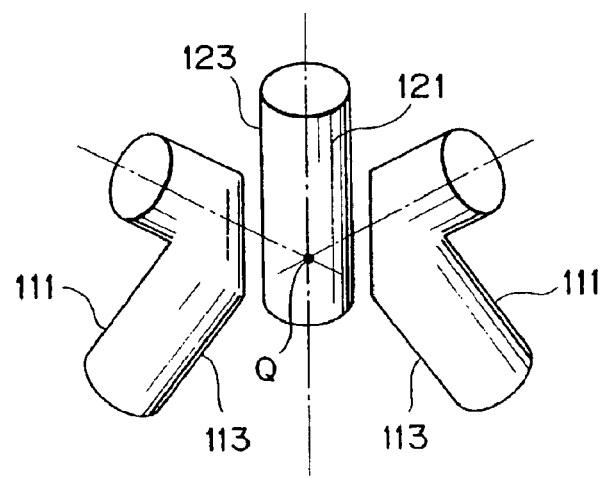

F I G. 15
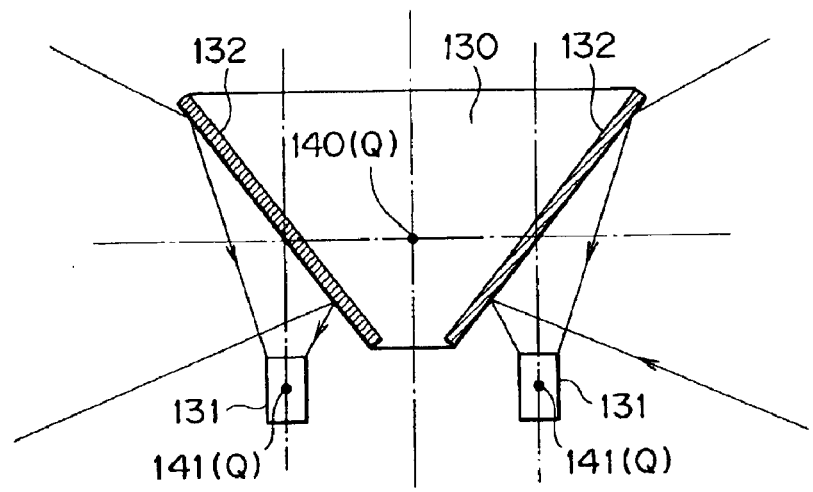
F I G. 16
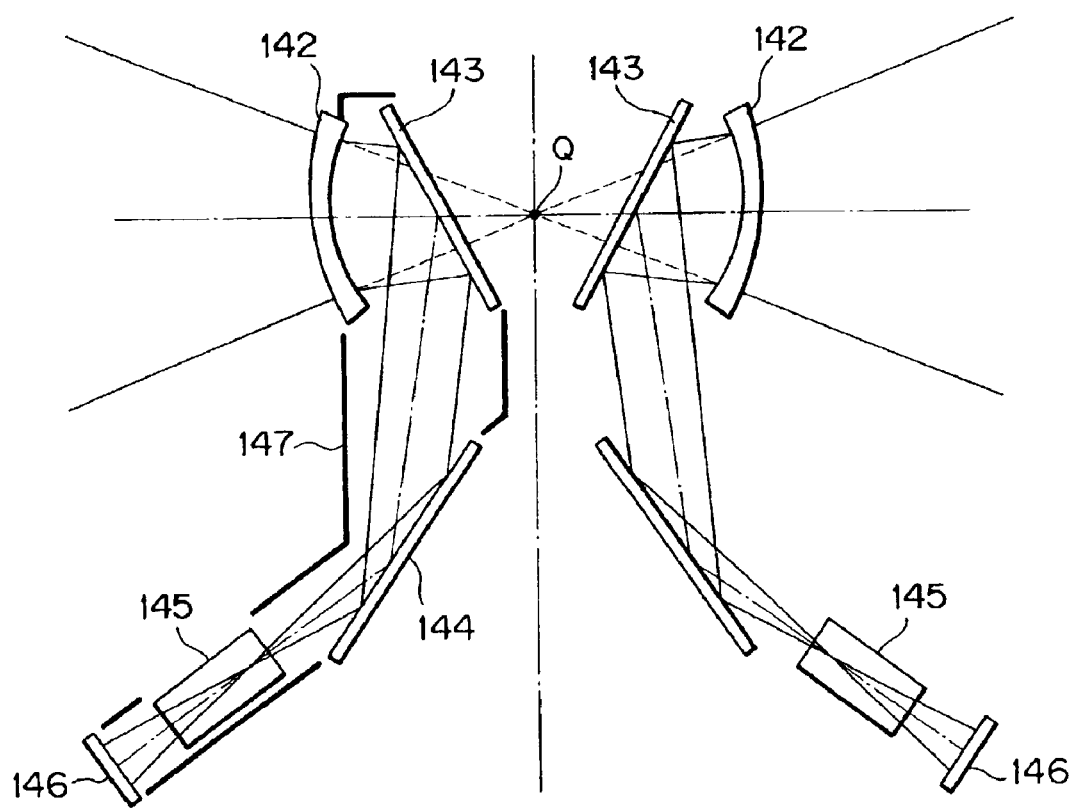

F I G. 19
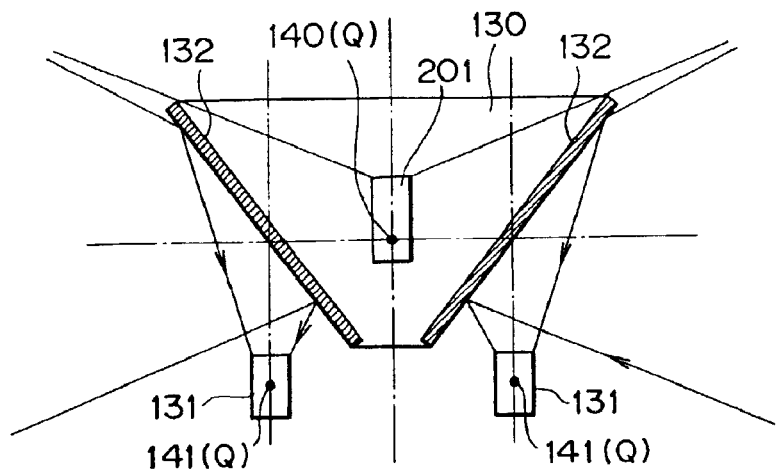
F I G. 20
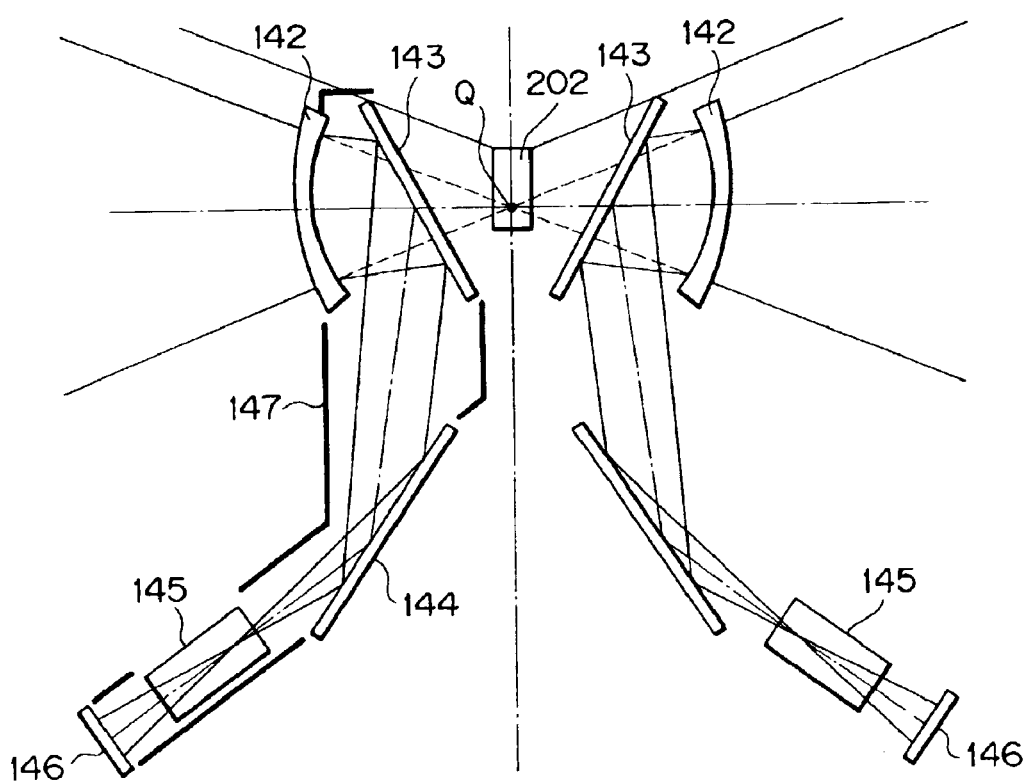

F I G. 21
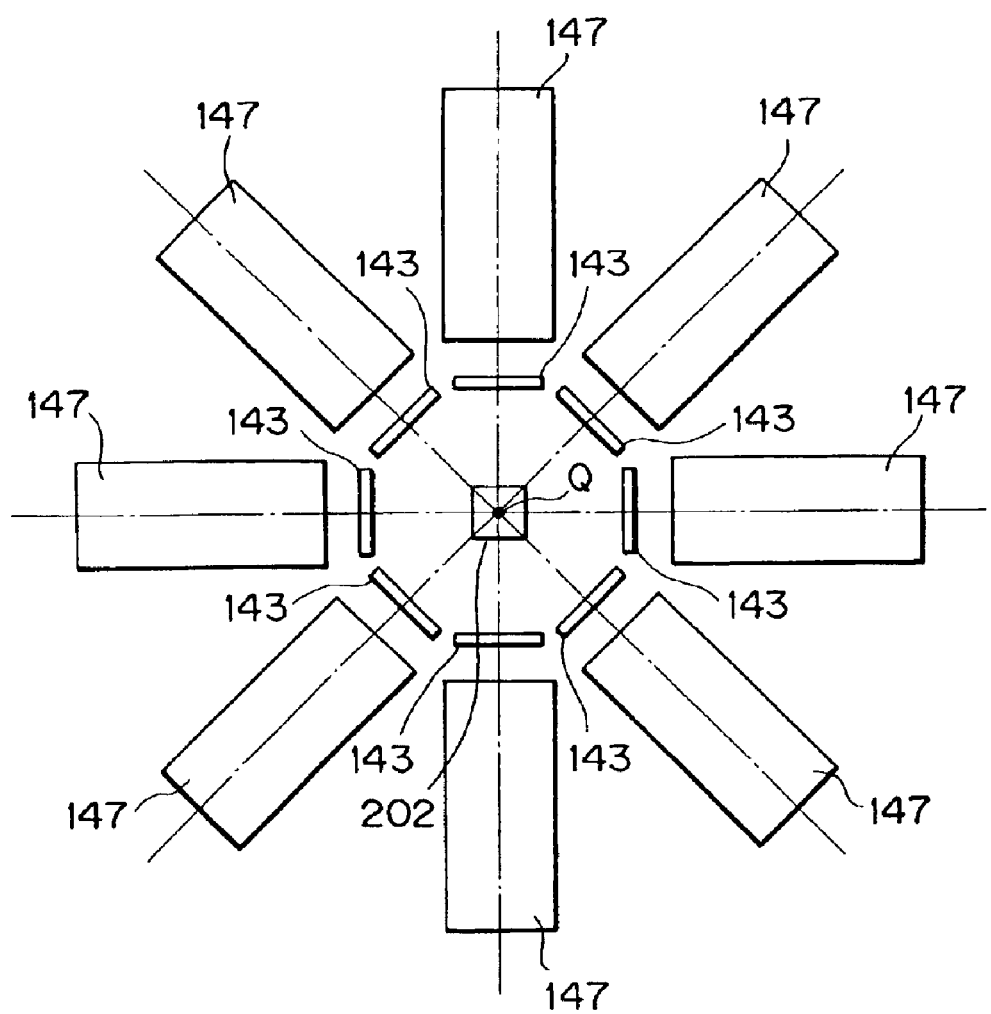

WIDE RANGE IMAGE PICKUP APPARATUS AND ARRANGEMENT FOR SUPPRESSING THE APPEARANCE OF PARALLAX

BACKGROUND OF THE INVENTION

This invention relates to an image pickup apparatus which picks up images of an image pickup object, for example, of a celestial hemispheric space over a wide range and stitches the images to each other to form a single image with a reduced parallax between the images.

Various camera apparatus have been developed wherein a large number of video cameras are accommodated in a housing and simultaneously pick up an image omnidirectionally or over an overall circumference.

For example, as shown in FIG. 1, in order to image, in a horizontal plane about a certain point in space selected as a viewpoint, and to obtain an image over a wide angle such as a panorama image about the selected viewpoint, a plurality of cameras 1, 2, . . . are disposed at equal distances in a circumferential direction along a circle centered at the viewpoint 1. The cameras are fixed with optical axes 3, 4, . . . of lenses 1a, 2a, . . . of the cameras 1, 2, . . . directed in radial directions as seen in FIG. 1. Then, individual images picked up by the cameras 1, 2, . . . are stitched together at positions over which they overlap with each other to allow image pickup over the overall circumference. Image pickup elements 5, 6, . . . such as CCDs are provided at the rear ends of the cameras 1, 2, . . . , rearwardly of the lenses 1a, 2a.

When the individual images picked up by the cameras 1, 2, . . . are stitched to as described above, a parallax is likely to appear at such overlapping locations. Thus, it is a technical subject in a picked up image processing technique how the parallax is reduced.

In conventional image pickup apparatus, however, the cameras 1, 2, . . . are located at positions at which each of them simply picks up an image of part of the image pickup object, and no particular countermeasure for solving the problem of the parallax described above is provided.

As a result, the parallax makes an obstacle to stitching of overlapping locations of picked up images after the image pickup is completed, and the images cannot be stitched well into a good image.

Further, in conventional image pickup apparatus, lens barrels of the cameras are physically restricted in terms of the arrangement relative to each other, and it is difficult to arrange the cameras in a closely neighboring relationship to each other. Therefore, a parallax is liable to appear between images picked up by the cameras.

Since the value of the parallax varies depending upon the distance from a camera to an image pickup object, when picked up images are stitched together after completion of the image pickup, an image obtained by the stitching varies depending on the position of an image in the overlapping region which is used as a reference for the stitching.

In particular, in order to carry out practical stitching of images which have a parallax, it is necessary for an editor to observe the images and determine what portion of the images is significant and then determine the position of that portion as a reference. This makes it difficult to automate the stitching of moving pictures, and creates a significant obstacle to the automation of processing of picked up images.

SUMMARY OF THE INVENTION

It is an object of the present invention to provide an image pickup apparatus which can suppress the appearance of a parallax to allow an image over a wide range to be obtained from multiple cameras.

In order to attain the object described above, the present invention provides an image pickup apparatus which includes, several image pickups for individually picking up images of a number of divided portions of an image pickup objects that extends over a wide range. The invention further provides a processor for receiving image information from the image pickups and processing the image information to produce a single image by stitching together images presented by the image information. The image pickups are disposed such that, where a point at which an extension of a straight line component in an object space of a selected one of the principal rays passing the center of an aperture stop for a lens set provided in each of the image pickups which is positioned in a Gauss region intersects with an optical axis of the lens set is set as an NP point (non-parallax point), the NP points of the image pickups are collectively set within a predetermined radius region centered at one of the NP points.

With this arrangement, since the NP points of the image pickups can be disposed at a substantially common position within the predetermined radius region, appearance of a parallax can be effectively suppressed. As a result, high precision image processing can be achieved.

Preferably, the radius of the predetermined radius region is set to approximately 20 mm from the center which is one of the NP points. In this instance, the NP points can be collected well in the limited region, and therefore, the appearance of a parallax can be further suppressed.

Preferably, the lens set of each of the image pickups includes a number of lenses arranged in multiple stages and is provided in a lens barrel, and the lens barrels of the image pickups are collectively disposed on a single support. In this instance, an image of an image pickup region is picked up divisionally using lens sets and cameras, and therefore, the image over a wide range can be picked up with high resolution by picking up the image with the high resolution by the cameras. Further, since the image pickups are collectively disposed on a single support, the degree of freedom of the structure of the apparatus is improved.

According to another aspect of the present invention, an image pickup apparatus is provided which includes, a plurality of image pickups for individually picking up images of divisional image portions of an image pickup object extending over a wide angular range. A processor is provided for receiving image information from the image pickups and for processing the image information to produce a single image by stitching images together from the image information. The image pickups as disposed such that, where a point at which an extension of a straight line component in an object space of a selected one of principal rays passing the center of an aperture stop for a lens set provided in each of the image pickups which is positioned in a Gauss region intersects with an optical axis of the lens set is set as an NP point. The NP point is set to a position outside a lens barrel by disposing, a mirror element intermediately of a light path which passes the lens set of the image pickup for bending incoming light at a predetermined angle in an inclined relationship by a predetermined angle. Thus, the NP points of the image pickups are collectively set within a predetermined radius region centered at one of the NP points.

According to the pickup apparatus of the present invention, since the NP points of the multiple image pickups can be disposed at a substantially common position collectively within the predetermined radius region centered at one of the NP points, the appearance of a parallax can be effectively suppressed. As a result, high precision image processing can be achieved.

The inclination angle of the mirror element may be set arbitrarily with respect the optical axis of the lens set. In this instance, the angle at which the incoming light is bent can be set freely by the mirror element. Consequently, the degree of freedom of the structure of the apparatus is improved and a compact apparatus may be formed.

The image pickup apparatus may further comprise additional image pickups having an NP point set within the predetermined radius region at a central position between the image pickups and the mirror elements which are arranged radially. In this instance, the image pickup angle can be further increased by the additional image pickups.

Principles of the present invention are described simply with reference to FIGS. 2 and 3. A lens for use with a video camera or a like apparatus is designed to minimize aberrations such as chromatic aberration, curvature of field and flare by combining a plurality of lenses. The lens of the type described is formed, in principle, from a thin single convex lens 11 as shown in FIG. 2. An image pickup element 12, which may be a video image pickup device such as a CCD or a MOS or, in the case of a silver salt camera, a film, is disposed at the focal point of the convex lens 11.

In the image pickup apparatus of the basic structure just described, if an angle arising from the refraction of the convex lens 11 is ignored, the angle of the field of view is determined substantially by the diameter d1 of the image pickup element 12 and the distance d4 (focal distance) between the convex lens 11 and the image pickup element 12 this can be represented by the expression tan(/2)=(d½)/(d4).

Accordingly, when the camera described above is used to pick up an image of an image pickup object, as the camera is pivoted around an NP point (non-parallax point) 13 as described below, no parallax appears between a plurality of images obtained by the image pickup the NP point is positioned at the center of the inside of the convex lens 11.

The NP point has been determined by the inventor through a great number of experiments. These experiments were conducted in order to determine how to reduce the parallax which appears when a plurality of images are stitched together based on a basic idea of an optical system. Next, the NP point will be described in connection with an arrangement wherein light reflected from an object forms an image on an image pickup section 301 through an equivalent convex lens 300 as seen in FIG. 3. In particular, referring to FIG. 3, the equivalent convex lens 300 includes lenses 302 to 308 arranged in order. An aperture stop 309 is interposed between the lens 304 and the lens 305. A principal ray 311 is selected from among a large number of principal rays which pass the center of the aperture stop 309. The selected principal ray 311 passes a region nearest to the optical axis 310, that is, a Gauss region in which the aberration is smallest. A straight line component of the principal ray 311 in an object space 312 is extended, and a point at which the extension intersects with the optical axis 310 is set as an NP point (non-parallax point) 313.

After the presence of the NP point 313 is verified, the NP point applied to a case wherein multiple cameras are used. In other words, the NP point is employed in a case where cameras are used to pick up an image instead of pivoting a single camera.

In the single convex lens 11 shown in FIG. 2, the position of the NP point 13 is a restricted point within the lens itself. Therefore, it is not possible to dispose multiple cameras such that the NP points 13 of each camera is a common NP point.

This is, due to the fact that, in a typically configured camera, the NP point is present in or around the lens, Lens barrels, image pickup elements, signal processing circuit sections and other components of multiple of cameras form physical obstacles which prevent the NP points of the cameras to be set so as to coincide with one another.

Consequently, a parallax appears between picked up images from multiple cameras having non-coincidental NP points, and this makes it impossible to pick up an omnidirectional image.

In contrast, it has been found that, if a number of lenses are combined as in the case of the equivalent convex lens 300 shown in FIG. 3, it is possible to establish the NP point 313 at an arbitrary position as a substantial extension of the optical axis 310.

Thus, according to the invention of the present application, the NP points 313 of a number of additional cameras are positioned within a predetermined radius region (spherical region) centered at the NP point 313 of one of a number of cameras. This eliminates appearance of a parallax between images of the different cameras.

On the other hand, with the configuration of an image pickup apparatus according to another aspect of the present invention, an imaginary NP point 313 can be set to the rear side of the lens barrel of each camera, that is, on the outside of each camera.

Thus, within a predetermined radius region (spherical region) centered at the imaginary NP point 313 of one of a plurality of cameras, the NP points 313 of all of the other cameras are positioned. Consequently, a common NP point region is obtained. This can sufficiently reduce appearance of a parallax between images picked up by the cameras.

The above and other objects, features and advantages of the present invention will become apparent from the following description and the appended claims, taken in conjunction with the accompanying drawings in which like parts or elements denoted by like reference symbols.

Additional features and advantages of the present invention are described in, and will be apparent from, the following Detailed Description of the Invention and the figures.

BRIEF DESCRIPTION OF THE FIGURES

FIG. 2 is a schematic view illustrating a principle of an image pickup apparatus according to the present invention;

FIG. 10 is a side elevation view of the image pickup apparatus of FIG. 8;

FIG. 11 is a schematic view showing an image pickup apparatus according to a sixth embodiment of the present invention;

FIG. 12 is a schematic view showing an arrangement of cameras of an image pickup apparatus according to a seventh embodiment of the present invention;

FIG. 15 is a sectional view taken along line A—A of FIG. 14;

FIG. 16 is a schematic view showing an image pickup apparatus according to a tenth embodiment of the present invention;

FIG. 19 is a section view taken along line A—A of FIG. 18;

FIG. 20 is a schematic view showing an image pickup apparatus according to a twelfth embodiment of the present invention; and FIG. 21 is a plan view showing an arrangement of cameras of the image pickup apparatus of FIG. 20.

DETAILED DESCRIPTION OF THE INVENTION

Figure 1:
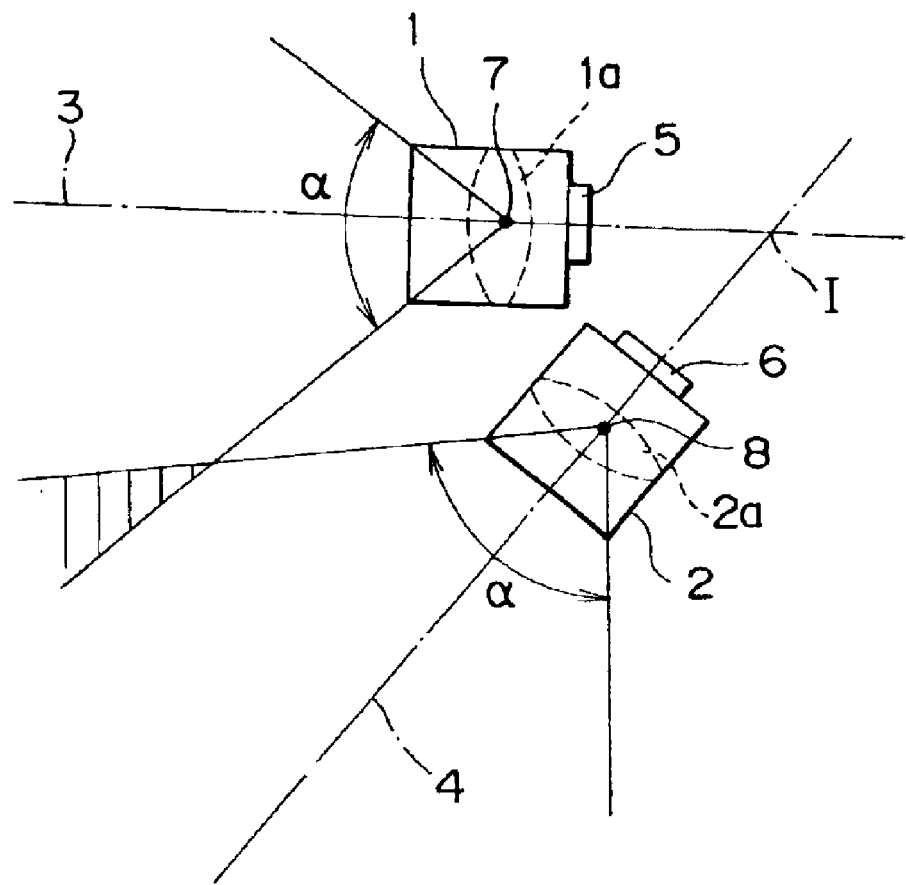
FIG. 1 is a schematic plan view showing a conventional image pickup apparatus.
Figure 3:
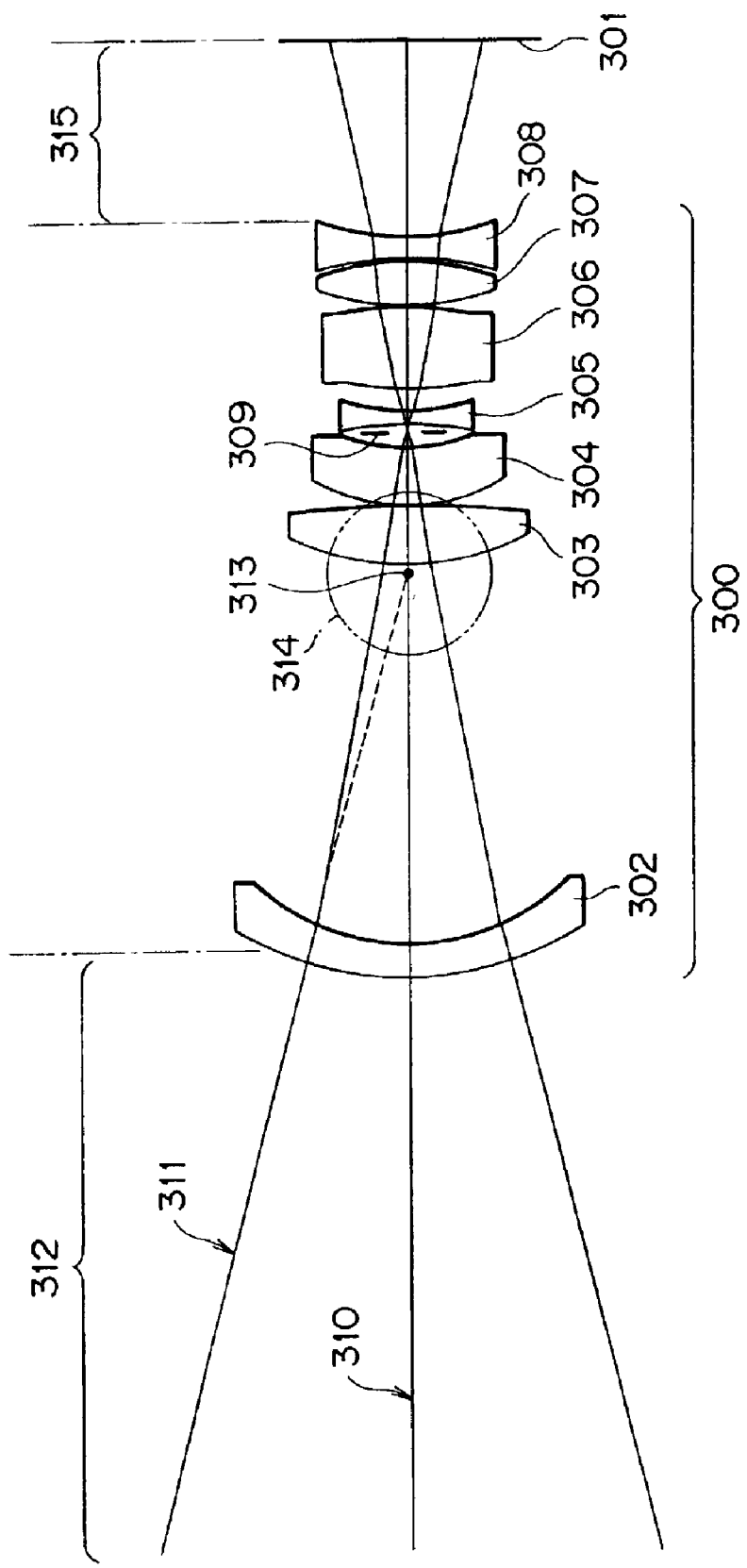
FIG. 3 is a schematic view illustrating a principle of another image pickup apparatus according to the present invention.
Figure 4:
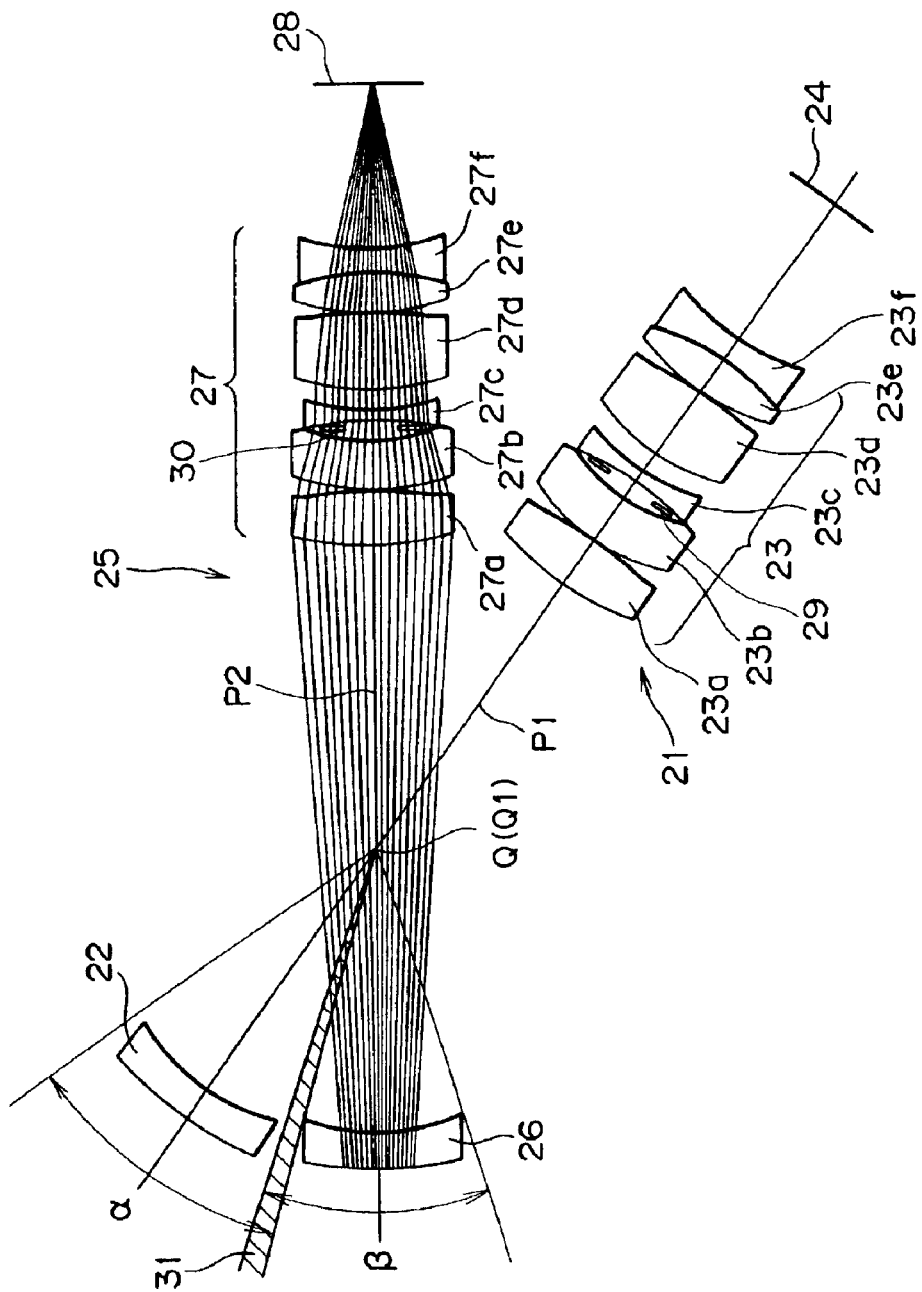
FIG. 4 is a schematic view showing an image pickup apparatus according to a first embodiment of the present invention.

Referring to FIG. 4, there is shown an image pickup apparatus according to a first embodiment of the present invention. The image pickup apparatus includes two video cameras each serving as an image pickup. In particular, the image pickup apparatus includes a first video camera 21 and a second video camera 25. The first video camera 21 includes a front lens 22 provided at a front position of a lens barrel not shown, a lens set 23 provided at a rear position of the lens barrel and including a number of lenses 23a to 23f, and a CCD 24 provided at a rearmost position of the lens barrel and serving as an image pickup element. The second video camera 25 similarly includes a front lens 26 provided at a front position of a lens barrel not shown, a lens set 27 provided at a rear position of the lens barrel and including a number of lenses 27a to 27f, and a CCD 28 provided at a rearmost position of the lens barrel and serving as an image pickup element.

Each of the front lenses 22 and 26 is formed from a concave lens, and each of the lens sets 23 and 27 including the lenses 23a to 23f and 27a to 27f, respectively, is formed from a combination of concave and convex lenses.

Each of the CCDs 24 and 28 has a flat plate-like configuration and is disposed on an optical axis P1 or P2 of the lenses 22 and 23 or 26 and 27 and secured to a rear end portion of the lens barrel.

In the first video camera 21, an aperture stop 29 is interposed between the lens 23b and the lens 23c. The aperture stop 29 selects; from among a large number of principal rays which pass the center of the aperture stop 29, that principal ray which passes a region nearest to the optical axis P1, that is, a Gauss region in which the aberration is smallest. A point at which an extension of a straight line component of the principal ray in an object space intersects with the optical axis P1 is set as a first NP point (non-parallax point) Q.

Also in the second video camera 25, an aperture stop 30 is interposed between the lens 27b and the lens 27c. The aperture stop 30 selects, from among a large number of principal rays which pass the center of the aperture stop 30, that principal ray which passes a region nearest to the optical axis P2, that is, a Gauss region in which the aberration is smallest. A point at which an extension of a straight line component of the principal ray in an object space intersects with the optical axis P2 is set as a second NP point Q1.

The second NP point Q1 is set so as to be positioned within a region (spherical region) of a radius of 20 mm centered at the first NP point Q.

In FIG. 4, and denote image pickup angles of view of the lenses of the video cameras 21 and 25, respectively. A portion 31 indicated by slanting lines is an overlap region in which images picked up by the video cameras 21 and 25 overlap with each other.

Accordingly, in the image pickup apparatus of the present embodiment, images of an image pickup object entering the lens barrels pass through the lenses 22 and 23 and the lenses 26 and 27 in the view angles and as seen in FIG. 4. The received images are input to the CCDs 24 and 28, respectively. Thereafter, the images are processed by processing sections and output to a processor which stitches the images together while they are overlapped with each other at the overlapping portions 31.

The incoming light having passed through the lenses 22 and 23a to 23f and the lenses 25 and 26a to 26f of the video cameras 21 and 25, respectively, forms the NP points Q and Q1 within the predetermined region substantially at the central position of the lens barrels. Accordingly, appearance of a parallax phenomenon by the video cameras 21 and 25 is prevented and the images can be stitched together well, and high precision image processing can be anticipated.

Figure 5:
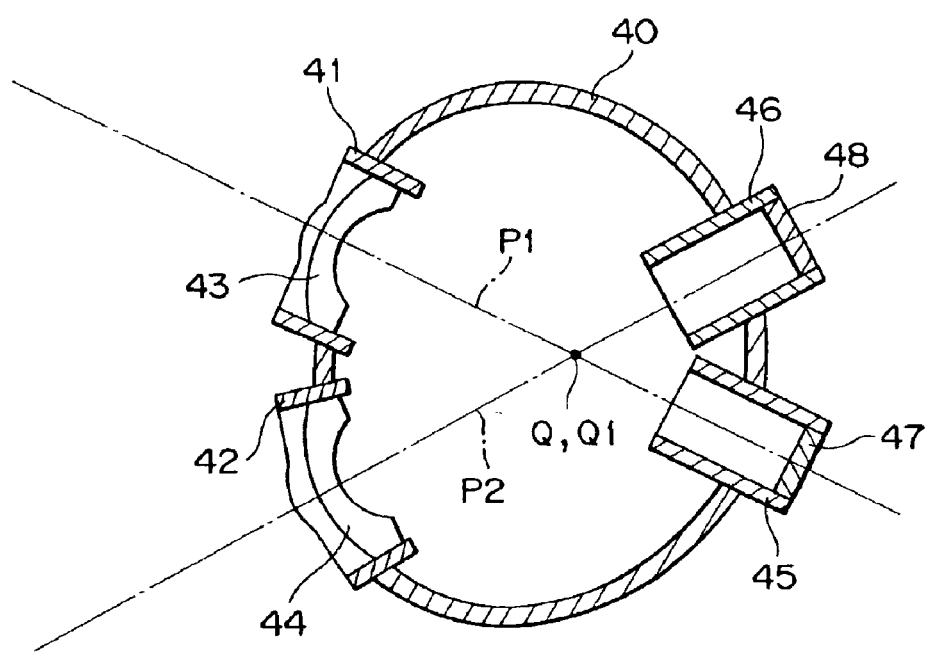
FIG. 5 is a transverse sectional view showing an image pickup apparatus according to a second embodiment of the present invention.

FIG. 5 shows an image pickup apparatus according to a second embodiment of the present invention. Referring to FIG. 5, a pair of barrel holes are formed at opening angle positions of approximately 56 degrees at front end portions of a housing 40 having a substantially circular horizontal section and serving as a support member. Two lens barrels 41 and 42 are fitted in and secured to the barrel holes, and a plurality of lenses 43 or 44 are provided in each of the lens barrels 41 and 42. Another pair of barrel holes are perforated at rear end portions of the housing 40 on optical axes P1 and P2 of the lenses 43 and 44, and element barrels 45 and 46 are fitted in and secured to the barrel holes. CCDs 47 and 48 each serving as an image pickup element are secured to rear ends in the inside of the element barrels 45 and 46, respectively, and processing sections not shown are electrically connected to the CCDs 47 and 48.

Also in the image pickup apparatus of the present embodiment, the lenses 43 and 44 are combined such that NP points Q and Q1 are set in the inside of the housing 40.

Accordingly, appearance of a parallax phenomenon by a plurality of video cameras is prevented and images can be stitched together well, and high precision image processing can be anticipated.

Further, since a number of cameras can be provided in the single housing 40, the entire apparatus can be compactly formed.

Figure 6:
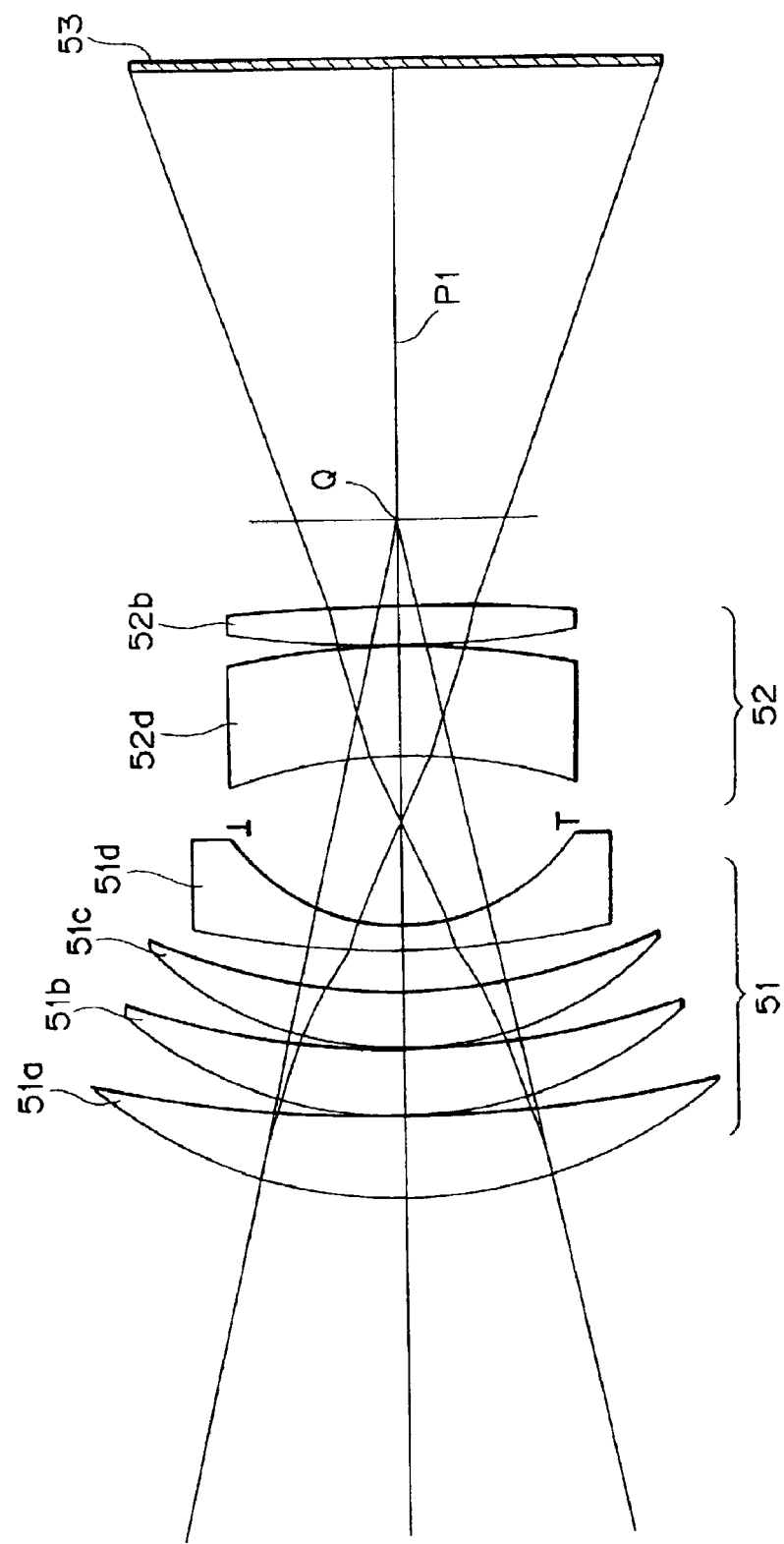
FIG. 6 is a transverse sectional view showing an image pickup apparatus according to a third embodiment of the present invention.

FIG. 6 shows an image pickup apparatus according to a third embodiment of the present invention. Referring to FIG. 6, a gap is provided between multiple lens sets 51 and 52. The arrangement of lenses 51a, 51b, 51c and 51d of the front side lens set 51 and the arrangement of lenses 52a and 52b of the rear side lens set 52 are changed arbitrarily to set an NP point Q at a position rearwardly of the lens set 52 as seen in FIG. 6. It is to be noted that reference numeral 53 in FIG. 6 denotes a CCD.

Accordingly, the NP point of another video camera or other video cameras is also set to the NP point Q set at a position rearwardly of the lens set 52, then a common NP point can be obtained.

Thus, a common NP point Q to a number of video cameras can be obtained by varying the positions of such NP points Q arbitrarily. As a result, a camera having a wide angle of view free from parallax can be designed.

Figure 7:
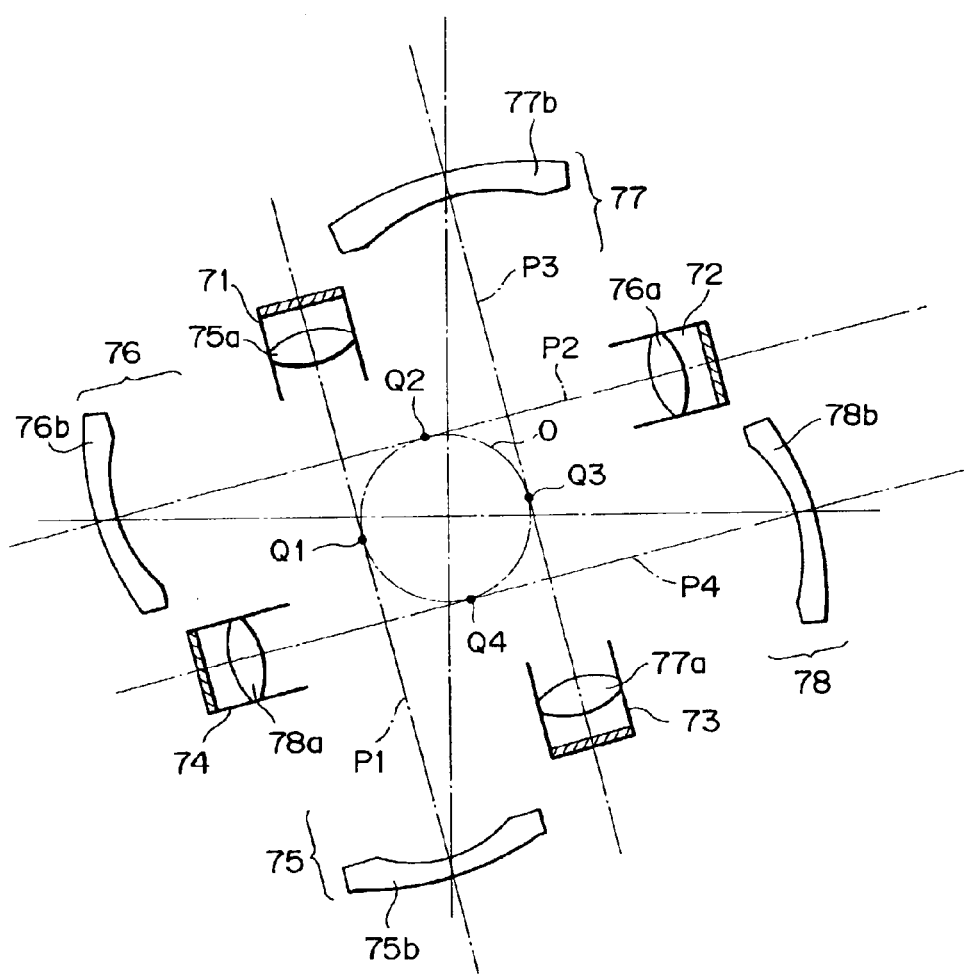
FIG. 7 is a schematic view showing an image pickup apparatus according to a fourth embodiment of the present invention.

FIG. 7 shows an image pickup apparatus according to a fourth embodiment of the present invention. The image pickup apparatus of the present embodiment allows image pickup over an overall circumference using four cameras disposed at angle positions spaced by approximately 90 degrees from each other in a circumferential direction. Referring to FIG. 7, lens sets 75 to 78 provided in lens barrels 71 to 74 of the cameras each include multiple lenses 75a and 75b, 76a and 76b, 77a and 77b, or 78a and 78b and are set such that optical axes P1 to P4 thereof extend in tangential directions relative to positions of a central imaginary circle O, the optical axes P1 to P4 are spaced by 90 degrees from each other in a circumferential direction.

Through such a unique arrangement configuration of the cameras as shown in FIG. 6, the NP points Q1, Q2, Q3 and Q4 are set at mutually neighboring positions spaced by 90 degrees from each other in the circumferential direction of the imaginary circle O.

Accordingly, with the image pickup apparatus of the present embodiment, the NP points Q1, Q2, Q3 and Q4 do not occupy a common position but are positioned spaced a small distance from each other. As a result, a parallax appears between images picked up from each adjacent video camera. However, since the displacement between the NP points Q1, Q2, Q3 and Q4 is small, the parallax can be sufficiently suppressed.

Further, through the unique arrangement of the cameras, the image pickup apparatus can pick up an image over an overall circumference of an image pickup object, and the degree of freedom in arrangement is improved. Further, compact formation of the entire apparatus can be achieved.

It is to be noted that cameras can be arranged not only two-dimensionally but also three-dimensionally including the upward and downward direction in which multiple cameras are disposed.

The present invention further provides an image pickup apparatus, that includes a number of image pickups for individually picking up images of multiple divisional image pickup objects of an image pickup object extending over a wide range. The apparatus also includes a processor for receiving image information from the image pickups and processing the image information to produce a single image by stitching together images presented by the image information. According to the invention, the image pickups are disposed such that, where a point at which an extension of a straight line component in an object space of a selected one of principal rays passing the center of an aperture stop for a lens set provided in each of the image pickups which is positioned in a Gauss region intersects with an optical axis of the lens set is set as an NP point, the NP point is set to a position outside a lens barrel by disposing, a mirror element intermediately of a light path which passes the lens set of the image pickup means. The mirror element bends incoming light at a predetermined angle. The NP points of the image pickups are collectively set within a predetermined radius region centered at one of the NP points.

In the image pickup apparatus according to the present invention, the radius of the predetermined radius region is set to approximately 20 mm from the center which is one of the NP points.

Further, according to the image pickup apparatus of the present invention, the inclination angle of the mirror is set arbitrarily with respect the optical axis of the lens set.

Furthermore, the image pickup apparatus according to the present invention further includes additional image pickups having an NP point set within the predetermined radius region at a central position between the image pickups and the mirror members which are arranged radially.

Figure 8:
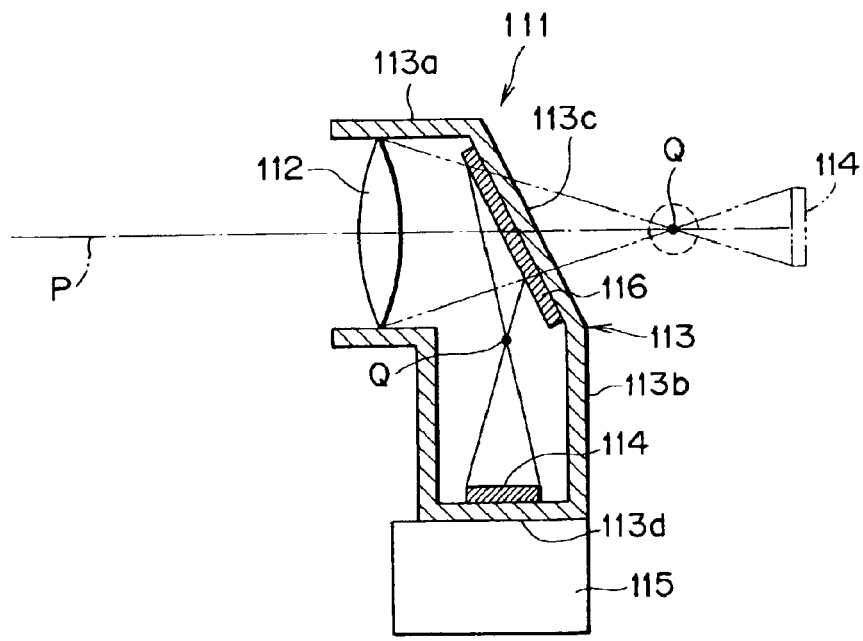
FIG. 8 is a schematic sectional view showing an image pickup apparatus according to a fifth embodiment of the present invention.
Figure 9:
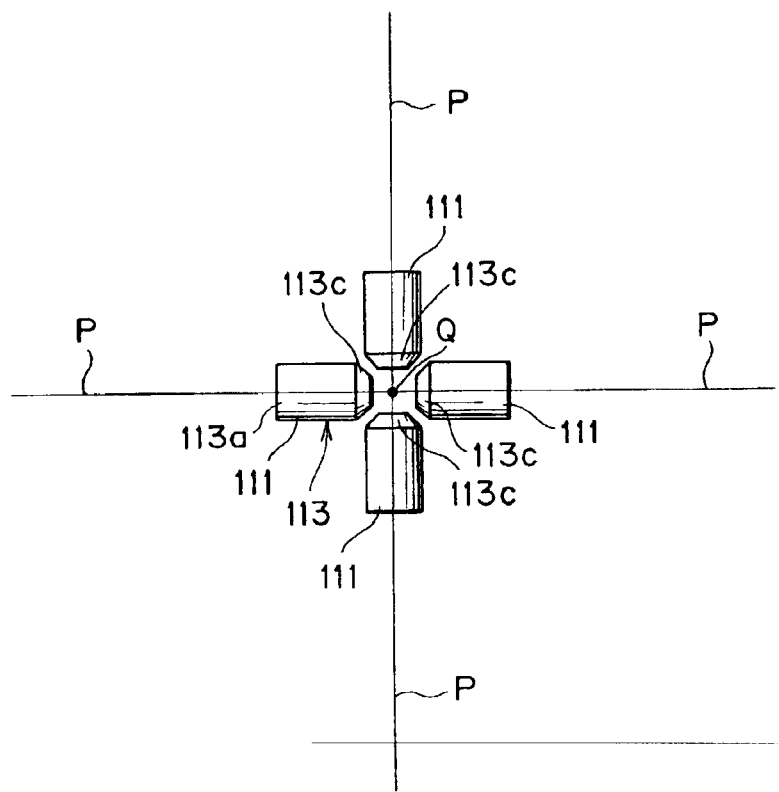
FIG. 9 is a plan view of the image pickup apparatus of FIG. 8.

FIG. 8 shows an image pickup apparatus according to a fifth embodiment of the present invention. Referring to FIG. 8, four CCD cameras 111 of the same structure are used and arranged radially at positions spaced by 90 degrees from each other in a circumferential direction as viewed in plan as seen in FIG. 9. Further, the CCD cameras 111 are disposed such that the backs thereof oppose each other as seen in FIG. 10, so that they can image over a range of 360 degrees.

Referring particularly to FIG. 8, each of the CCD cameras 111 includes, as principal components thereof, a lens barrel 113 in which a plurality of lenses 112 (only one is shown) are successively fixedly disposed, a CCD 114 disposed in the inside of a rearmost end of the lens barrel 113. The CCD is provided for scanning an electric signal, which increases in proportion to incoming light through the lenses 112, and to successively extract such electric signals. A processing section 115 is provided at a rear end portion of the lens barrel 113 for processing image information from the CCD 114. The image pickup apparatus further includes a processor means not shown for stitching images of the image signals from the processing section 115 to produce a single image.

The lens barrel 113 includes a front end portion 113a extending horizontally and a rear end portion 113b extending vertically downwardly in a bent form from a rear end of the front end portion 113a. An outer end portion 113c of the bent portion of the lens barrel 113 is inclined at an angle of approximately 45 degrees with respect to an optical axis P of the lenses 112, and a mirror member 116 is secured to an inner face of the inclined outer end portion 113c.

Accordingly, the mirror member 116 is disposed in an inclined relationship with the angle of approximately 45 degrees with respect to the optical axis P.

The CCD 114 is in the form of a flat plate and is secured to an upper face of a bottom face portion 113d of the bent lens barrel 113.

Further, the processing section 115 is secured to a lower face of the rear end portion 113b of the lens barrel 113 and performs circuit processing of an AGC circuit and so forth for the image information signal from the CCD 114. It is to be noted that also the other three video cameras 111 are formed with the same configuration as that of the video camera 111 described above and the video cameras 111 are disposed such that the bent rear end portions 113b of the lens barrels 113 thereof are opposed to each other as seen in FIGS. 9 and 10 so that NP points Q thereof which are hereinafter described are disposed within a spherical region of a predetermined radius in a space among the rear end portions 113b and set at a substantially common position.

In particular, one of the video cameras 111 includes an aperture stop not shown provided at a position forwardly of the lenses 112. The aperture stop selects, from among a large number of principal rays which pass the center of the aperture stop, that principal ray which passes a region very near to the optical axis P, that is, a Gauss region in which the aberration is very small. A point at which an extension of a straight line component of the principal ray in an object space intersects with the optical axis P is set as a first NP point (non-parallax point) Q.

Also any other one of the video cameras 111 includes an aperture stop not shown provided at a position forwardly of the lenses 112. The aperture stop selects, from among a large number of principal rays which pass the center of the aperture stop, that principal ray which passes a region very near to the optical axis P, that is, a Gauss region in which the aberration is very small. A point at which an extension of a straight line component of the principal ray in an object space intersects with the optical axis P is set as a second NP point Q.

Incoming light passing through each of the lenses 112 is bent downwardly by the mirror member 116, and consequently, the NP point Q1 thereof is positioned within the bent rear end portion 113b of the lens barrel 113. Originally, however, the NP point Q should be formed at a position rearwardly of the outer end portion 113c as indicated by an alternate long and short dash line in FIG. 8.

Accordingly, since the incoming light is bent by 90 degrees by the mirror member 16, the region of a radius of 20 mm on the rear side of the four video cameras 111 can be set as a common imaginary NP point Q.

In order to allow images picked up by the video cameras 111 to be stitched to each other without a parallax, the video cameras 111 are set such that the NP points thereof may be disposed within a region (spherical region) of a predetermined radius. Preferably, the video cameras 111 are set such that the NP points thereof may be disposed within a region (spherical region) of a radius of approximately 20 mm as described hereinabove.

Accordingly, with the image pickup apparatus of the present embodiment, an image of an image pickup object incoming to the lens barrel 113 passes through the lenses 112 and comes to the mirror member 116, and is then bent downwardly at an angle of approximately 90 degrees by the mirror member 116 and then inputted to the CCD 114 as seen in FIG. 8. Thereafter, the image is processed by the processing section 115 and outputted to the processing means. The processing means stitches such four images received from the video cameras 111 to each other such that they overlap with each other at overlapping portions therebetween. In this instance, since the NP points are disposed collectively in the region of the radius of substantially 20 mm, appearance of a parallax phenomenon by the video cameras 111 is prevented and the images can be stitched to each other well, and high precision image processing can be achieved.

It should be noted that the projecting value of each of the NP points Q to the outer side from the lens barrels 113 can be set higher as the angle of view decreases. Therefore, it is possible to prepare eight video cameras 111 and arrange them radially at positions spaced by 45 degrees from each other in a circumferential direction to image over a range of 360 degrees at a time as in an image pickup apparatus according to a sixth embodiment of the present invention shown in FIG. 11. Also in this instance, the NP point Q can be set at the central position of the entire apparatus and can be disposed at a further rearwardly receding position.

Further, as a variation to the arrangement of video cameras 111, it is possible to dispose, at a central position of such a radial arrangement of video cameras 111 as described above, an additional video camera 121 having a vertical lens barrel 123, for example, as shown in FIG. 12 which shows an image pickup apparatus according to a seventh embodiment of the present invention.

In this instance, the NP points Q of the video cameras 111 disposed radially are set so as to coincide substantially with each other, and also the NP point of the video camera 121 is set so as to coincide substantially with the NP points Q of the video cameras 111.

In other words, the image pickup apparatus of the present embodiment includes a first image pickup section including multiple image pickups, that is, a camera set (two video cameras 111) for reflecting and bending incoming light and picking up an image of the incoming light and a second image pickup section (additional image pickup means) including a camera set (video camera 121) for picking up an image of incoming light directly without reflecting the incoming light, NP points Q of the image pickups of the first and second image pickup sections being made substantially coincide with each other.

Also in this instance, the NP points Q of the video cameras 111 and 112 can be set to a rearward central position of the entire apparatus, and an image pickup object can be imaged over a predetermined angle of view by the central video camera 121 and the image pickup angle can be further increased by the video cameras 111 and 121.

Figure 13:
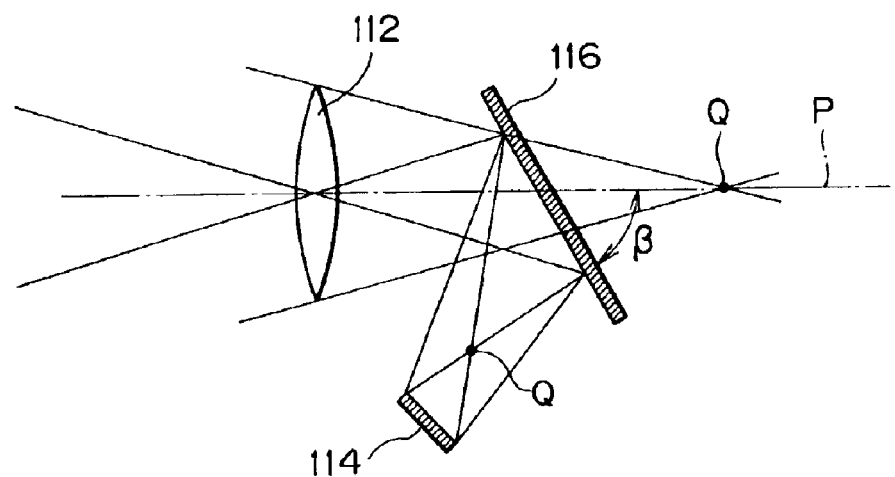
FIG. 13 is a schematic view showing an image pickup apparatus according to an eighth embodiment of the present invention.

FIG. 13 shows an image pickup apparatus according to an eighth embodiment of the present invention. Referring to FIG. 13, in the image pickup apparatus shown, the inclination angle of the mirror member 116 from the optical axis P is set to an angle other than 45 degrees such as, for example, 30 degrees or 42 degrees. This increases the degree of freedom of the layout of the image pickup element 114 and further increases the degree of freedom in arrangement of video cameras.

Figure 14:
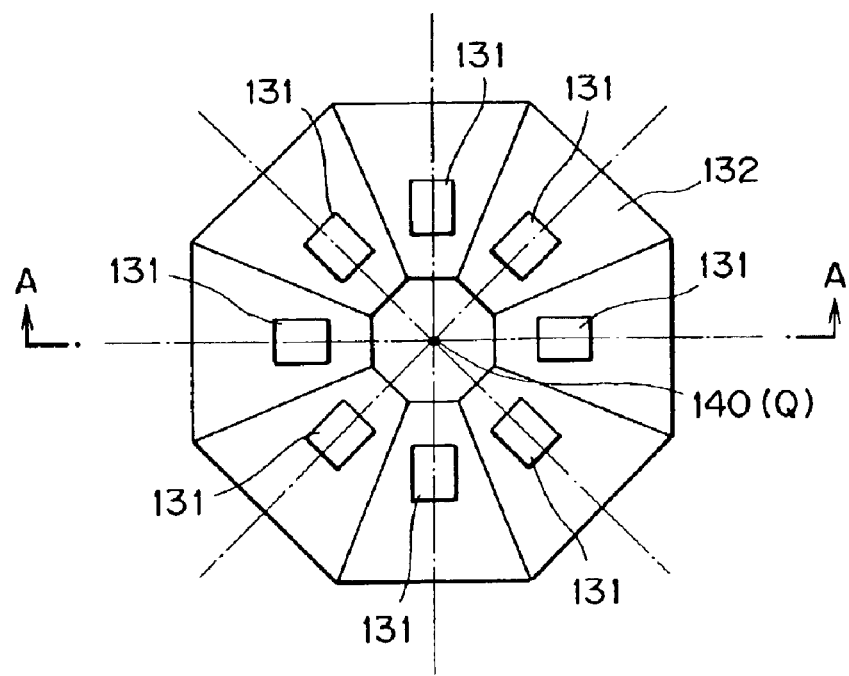
FIG. 14 is a schematic plan view showing an image pickup apparatus according to a ninth embodiment of the present invention.

FIGS. 14 and 15 show an image pickup apparatus according a ninth embodiment of the present invention.

Referring to FIGS. 14 and 15, eight mirrors 132 are secured to flat face portions of an octagonal pyramid-shaped support member 130 and disposed such that incoming light (indicated by an arrow mark) is first reflected by the mirrors 132 and then introduced into a number of lenses of each of eight video cameras 131 provided corresponding to the mirrors 132. In FIG. 15, reference numeral 141 denotes the NP point Q of the lenses of each of the video cameras 131. As the mirrors 132 reflect the incoming light, imaginary NP points 140 can be made coincide with each other in the support member 130 for the eight video cameras 131. Thus, by disposing the mirrors 132 in front of the lenses to bend the light paths, the appearance of a parallax can be substantially prevented.

Figure 17:
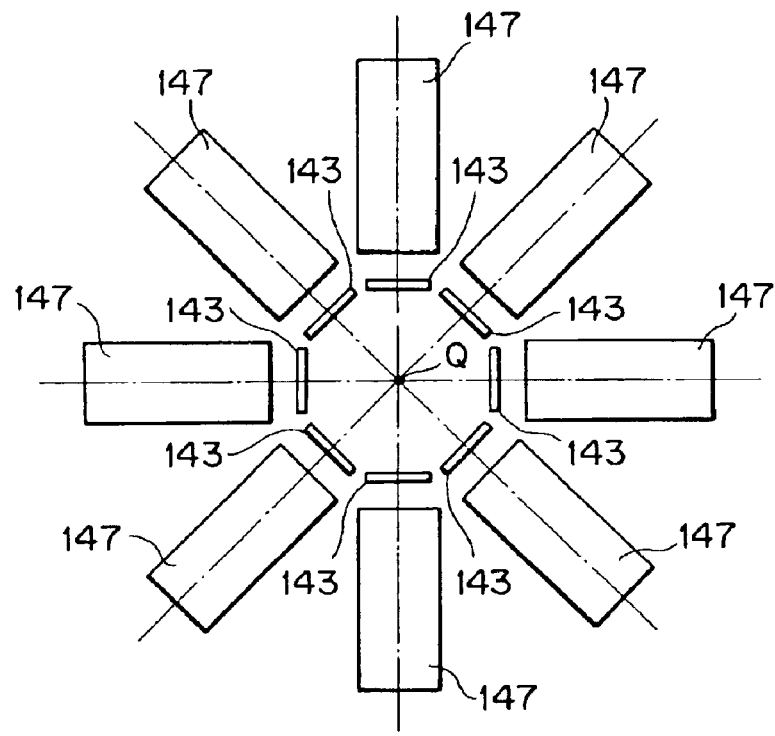
FIG. 17 is a plan view showing an arrangement of cameras of the image pickup apparatus of FIG. 16.

FIGS. 16 and 17 show an image pickup apparatus according to a tenth embodiment of the present invention. Referring to FIGS. 16 and 17, eight cameras 147 are disposed radially such that imaginary NP points Q are set to a substantially central position of eight first mirrors 143 disposed forwardly of the cameras 147 and arranged in a substantially pyramid-like configuration.

In particular, the first mirrors 143 are positioned between imaginary NP points Q and nearest objective lenses 142 of the image pickup lenses such that the imaginary NP points Q of the cameras 147 may substantially coincide with each other. Further, a second mirror 144 is disposed between a rear lens set 145 and a first mirror 143 such that a light path is bent thereby to assure a space around each image pickup element (CCD or the like) 146. This makes it possible to form the apparatus from 3CCD cameras of a high picture quality.

Accordingly, not only the appearance of a parallax can be sufficiently prevented, but also the efficiency in arrangement can be further improved to further promote compact formation of the entire apparatus.

Figure 18:
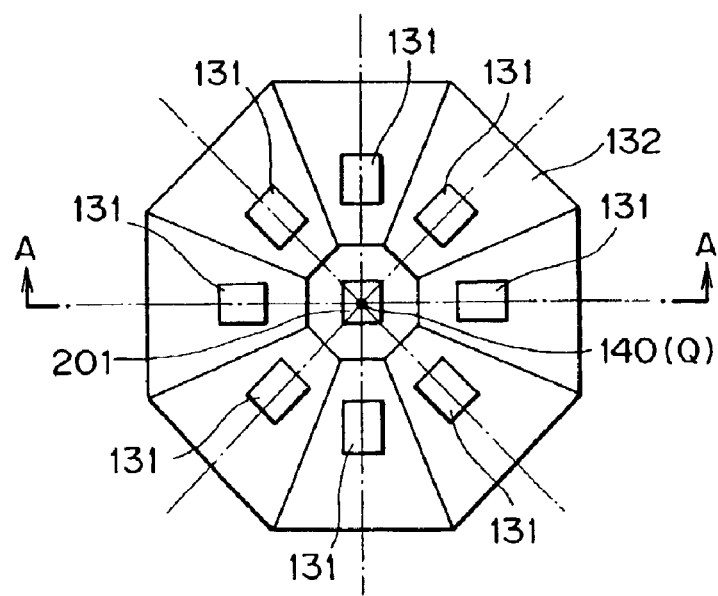
FIG. 18 is a schematic view showing an image pickup apparatus according to an eleventh embodiment of the present invention.

FIGS. 18 and 19 show an image pickup apparatus according to an eleventh embodiment of the present invention.

The image pickup apparatus of the present embodiment is a modification to the image pickup apparatus according to the ninth embodiment described hereinabove with reference to FIGS. 14 and 15 but is different in that, at a central position of video cameras radially disposed, another video camera 201 having a vertical lens barrel is disposed similarly as in the image pickup apparatus of the seventh embodiment described hereinabove with reference to FIG. 12.

Referring to FIGS. 18 and 19, eight mirrors 132 are secured to flat face portions of an octagonal pyramid-shaped support member 130 and disposed such that incoming light (indicated by an arrow mark) is first reflected by the mirrors 132 and then introduced into multiple lenses of each of eight video cameras 131 provided corresponding to the mirrors 132. In FIG. 19, reference numeral 141 denotes the NP point Q of the lenses of each of the video cameras 131. As the mirrors 132 reflect the incoming light, imaginary NP points 140 can be made coincide with each other in the support member 130 for the eight video cameras 131. Thus, by disposing the mirrors 132 in front of the lenses to bend the light paths, the appearance of a parallax can be prevented sufficiently.

Further, a single lens (not shown) and a video camera 201 for imaging upwardly are disposed at a central portion of a hollow of the support member 130. The video camera 201 directly picks up an image of incident light which is not reflected by the mirrors 132.

Furthermore, the NP point of the video camera 201 is made substantially coincide with the imaginary NP points 140 described above.

Thus, the image pickup apparatus of the present embodiment includes a first image pickup section including a number of image pickups, that is, a camera set (eight video cameras 131) for reflecting and bending incoming light by means of the mirrors 132 and picking up an image of the incoming light and a second image pickup section (additional image pickup means) including a camera (video camera 201) for picking up an image of incoming light directly without reflecting the incoming light by means of the mirrors 132, NP points Q of the image pickups of the first and second image pickup sections being made substantially coincide with each other.

Due to the configuration described above, an image pickup object can be imaged over a predetermined view angle by the central video camera 201 and the image pickup angle can be further increased by the video cameras 131 and 201.

Further, since the imaginary NP points 140 of the camera group wherein the mirrors 132 are disposed in front of the lenses to bend the light paths to pick up images, that is, the eight video cameras 131, and the NP point of the camera group wherein incoming light is imaged directly without being reflected by any mirror 132, that is, the central video camera 201, are made to substantially coincide with each other, the appearance of a parallax can be sufficiently prevented and omnidirectional images other than a downward image can be picked up.

It is to be noted that, although the image pickup apparatus of the embodiment described above is configured such that a plurality of mirrors 132 are disposed in an octagonal pyramid-like configuration and eight video cameras are disposed corresponding to the mirrors 132, according to the present invention, mirror members need not necessarily be disposed in an octagonal pyramid-like configuration but may be disposed in any polygonal pyramid-line configuration.

A number of plane mirrors are disposed in a polygonal pyramid-like configuration as the mirror members of the first image pickup section, and the second image pickup section is disposed on the center line of the polygonal pyramid, that is, on a normal line to the polygonal pyramid, such that the optical axes thereof may substantially coincide with each other and the NP points thereof may substantially coincide with each other.

FIGS. 20 and 21 show an image pickup apparatus according to a twelfth embodiment of the present invention.

The image pickup apparatus of the present embodiment is a modification to the image pickup apparatus of the tenth embodiment described hereinabove with reference to FIGS. 16 and 17 but is different in that, at a central position of a plurality of video cameras disposed radially, another video camera 202 having a vertical lens barrel is disposed similarly as in the image pickup apparatus of the seventh embodiment described hereinabove with reference to FIG. 12.

Referring to FIGS. 20 and 21, eight video cameras 147 are disposed radially such that imaginary NP points Q are set to a substantially central position of eight first mirrors 143 disposed at positions forwardly of the video cameras 147 and arranged in a substantially pyramid-like configuration.

In particular, the first mirrors 143 are positioned between imaginary NP points Q and nearest objective lenses 142 of the image pickup lenses such that the imaginary NP points Q of the cameras 147 may substantially coincide with each other. Further, a second mirror 144 is disposed between a rear lens set 145 and a first mirror 143 such that a light path is bent thereby to assure a space around each image pickup element (CCD or the like) 146. This makes it possible to form the apparatus from 3CCD cameras of a high picture quality.

Further, a single video camera 202 for imaging upwardly are disposed at a central position among the first mirrors 143 disposed radially. The video camera 202 directly picks up an image of incident light which is not reflected by the first mirrors 143.

Furthermore, the NP point of the video camera 202 is made substantially coincide with the imaginary NP points Q described above.

Thus, the image pickup apparatus of the present embodiment includes a first image pickup section including multiple of image pickups, that is, a camera set (eight video cameras 147) for reflecting and bending incoming light by means of the first mirror 143s and picking up an image of the incoming light and a second image pickup section (additional image pickup means) including a camera set (video camera 202) for picking up an image of incoming light directly without reflecting the incoming light, NP points of the image pickups of the first and second image pickup sections being made to substantially coincide with each other.

Due to the configuration described above, an image pickup object can be imaged over a predetermined view angle by the central video camera 202 and the image pickup angle can be further increased by the video cameras 147 and 202.

Consequently, even an image pickup apparatus which includes a color separation prism and a 3CCD camera for a high picture quality in which a signal processing circuit occupies a great part can image over a wide range.

It is to be noted that, in the present invention, it is possible to adopt different configurations for the arrangement of mirror members described above.

In particular, a mirror member for bending incoming light at a predetermined angle may be placed in an inclined relationship by a predetermined angle at one or more of locations of a light path passing a lens of image pickup means between an image pickup object and one of lenses nearest to the image pickup object (in the object space), between the lens nearest to the image pickup object and another one of the lenses which is nearest to an image and between the lens nearest to the image and the plane of the image (image space).

The present invention is not limited to the embodiments described above but may have various configurations within the spirit and scope thereof. For example, it is possible to vary the arrangement of video cameras or lens barrels or increase or decrease the number of them to effect three-dimensional and efficient image pickup.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An image pickup apparatus, comprising:
   a plurality of image pickups for individually picking up images of a plurality of divisional image pickup objects of an image pickup object extending over a wide range; and
   a processor for receiving image information from said image pickups and processing the image information to produce a single image by stitching images presented by the image information;
   said image pickups being disposed such that, where a point at which an extension of a straight line component in an object space of a selected one of principal rays passing the center of an aperture stop for a lens set provided in each of said image pickup means which is positioned in a Gauss region intersects with an optical axis of said lens set is set as an NP point, the NP points of said image pickup means are collectively set within a predetermined radius region centered at one of the NP points.

2. An image pickup apparatus according to claim 1, wherein the radius of the predetermined radius region is set to approximately 20 mm from the center which is one of the NP points.

3. An image pickup apparatus according to claim 1, wherein said lens set of each of said image pickups includes a plurality of lenses arranged in a plurality of stages and is provided in a lens barrel, and the lens barrels of said image pickups are collectively disposed on a single support member.

4. An image pickup apparatus, comprising:
   a plurality of image pickups for individually picking up images of a plurality of divisional image pickup objects of an image pickup object extending over a wide range; and
   a processor for receiving image information from said image pickups and processing the image information to produce a single image by stitching images presented by the image information;
   said image pickups being disposed such that, where a point at which an extension of a straight line component in an object space of a selected one of principal rays passing the center of an aperture stop for a lens set provided in each of said image pickups which is positioned in a Gauss region intersects with an optical axis of said lens set is set as an NP point, the NP point is set to a position outside a lens barrel by disposing, intermediately of a light path which passes said lens set of the image pickups, a mirror member for bending incoming light at a predetermined angle in an inclined relationship by a predetermined angle so that the incoming light is bent and the NP points of said image pickup means are collectively set within a predetermined radius region centered at one of the NP points.

5. An image pickup apparatus according to claim 4, wherein the radius of the predetermined radius region is set to approximately 20 mm from the center which is one of the NP points.

6. An image pickup apparatus according to claim 4, wherein the inclination angle of said mirror member is set arbitrarily with respect the optical axis of said lens set.

7. An image pickup apparatus according to claim 4, further comprising additional image pickups having an NP point set within the predetermined radius region at a central position between said image pickup means and the mirror members which are arranged radially.

* * * * *